(12) United States Patent
Uchiyama et al.

(10) Patent No.: US 6,839,178 B2
(45) Date of Patent: Jan. 4, 2005

(54) METHOD OF PRODUCING A TRANSMISSIVE SCREEN AND THE TRANSMISSIVE SCREEN

(75) Inventors: Shoichi Uchiyama, Shimosuwa-machi (JP); Satoru Miyashita, Chino (JP); Hiroshi Kiguchi, Suwa (JP); Hironori Hasei, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/619,455

(22) Filed: Jul. 16, 2003

(65) Prior Publication Data

US 2004/0012857 A1 Jan. 22, 2004

Related U.S. Application Data

(63) Continuation of application No. 10/069,756, filed as application No. PCT/JP01/05774 on Jul. 3, 2001, now Pat. No. 6,621,637.

(30) Foreign Application Priority Data

Jul. 3, 2000 (JP) .................................... 2000-201273

(51) Int. Cl.[7] .......................... G02B 27/10; G02B 21/60
(52) U.S. Cl. ...................................... 359/620; 359/455
(58) Field of Search .............................. 359/619, 620, 359/622, 455, 463

(56) References Cited

U.S. PATENT DOCUMENTS

| | | | |
|---|---|---|---|
| 1,942,841 A | 1/1934 | Shimizu | 359/455 |
| 2,378,252 A | 6/1945 | Staehle et al. | 359/453 |
| 3,552,822 A | 1/1971 | Altman | 359/453 |
| 5,563,738 A | 10/1996 | Vance | 359/614 |
| 6,297,911 B1 | 10/2001 | Nishikawa et al. | 359/619 |
| 6,304,384 B1 | 10/2001 | Nishikawa | 359/619 |

FOREIGN PATENT DOCUMENTS

| | | |
|---|---|---|
| GB | WO 9936830 A2 | 7/1999 |
| JP | 03-181934 | 8/1991 |
| JP | Y2-2513508 | 7/1996 |
| JP | A 10-128563 | 5/1998 |
| JP | A 11-258410 | 9/1999 |
| JP | 2000-75106 | 3/2000 |
| JP | A 2000-108216 | 4/2000 |
| JP | A 2000-155380 | 6/2000 |
| WO | WO 9936830 | 7/1999 |

OTHER PUBLICATIONS

Patent Abstracts of Japan, vol. 015, No. 435, p. 1272, Nov. 1991 & JP 03 181934 A, Aug. 1991.

*Primary Examiner*—David N. Spector
(74) *Attorney, Agent, or Firm*—Oliff & Berridge, PLC

(57) ABSTRACT

The invention provides a method of producing a transmissive screen having a structure including light-absorption-material patterns that are formed on locations corresponding to locations of lens members, which are provided side by side on a light-transmissive substrate, and to locations of boundary portions between the corresponding lens members. In this method, lens compositions are discharged onto and are caused to land on the light transmissive substrate, and, by drops of the lens compositions, very small lens members or precursors thereof are formed. It is possible to provide a method of producing a transmissive screen, which makes it possible to realize, at a low cost, a bright transmissive screen which has high contrast ratio and which can display a high-quality image having reduced or no moiré and reduced or no speckles.

1 Claim, 11 Drawing Sheets

(a)

(b)

(a)

(b)

(c)

(d)

(a)

(b)

(c)

(d)

(a)

(b)

(c)

(a)

(b)

(a)

(b)

(a)

(b)

(a)

(b)

METHOD OF PRODUCING A TRANSMISSIVE SCREEN AND THE TRANSMISSIVE SCREEN

This is a Continuation Application of application Ser. No. 10/069,756 filed Feb. 28, 2002, now U.S. Pat. No. 6,621,637, which in turn is a National Stage of International Application No. PCT/JP01/05774 filed Jul. 3, 2001. The entire disclosure of the prior applications are hereby incorporated by reference herein in its entirety.

BACKGROUND OF THE INVENTION

1. Field of Invention

The present invention relates to a projection screen technology, and more particularly, to a method of producing a transmissive screen used as a display screen of a projection television or a microfilm reader, for example. The invention also relates to a transmissive screen produced by this method.

2. Description of Related Art

In recent years, rear projectors that use a liquid crystal light valve or a CRT as a large screen display have been the focus of attention. The display displays an image by forming an image on a transmissive screen using image light from an image projecting portion. This type of transmissive screen is bright when an observer observes the image and has predetermined very small lens members formed thereon so as to increase the viewing angle.

As shown in FIG. 11, with regard to light distribution property of such a bright screen that has a wide viewing angle, a viewing angle 1101, which is wider in the horizontal direction than in the vertical direction, is preferred. This is because the viewing angle of a human being is wider in the horizontal direction than in the vertical direction. When the light distribution is made to be equal in the vertical and horizontal directions, light is also distributed in the vertical direction which is not actually necessary with regard to the viewing angle of a human being, so that the brightness as a whole is reduced.

Representative examples of the structures of the transmissive screen include the following:

①A lenticular sheet includes a lens portion that is formed by providing convex cylindrical lenses (semi-circular cylindrical convex lenses) side by side. As shown in FIG. 9(a), in general, the lenticular sheet has a structure that is formed by forming both surfaces of the sheet into convex cylindrical lens surfaces 901, forming protrusions at boundary portions between the respective cylindrical lenses at one of the surfaces of the sheet (the surface from which image light 201 exits), and forming a light-shielding layer (a black stripe having a light-absorption property) 902 on the top portion of each of the protrusions.

The lenticular sheet is obtained by performing a press-molding operation on a transparent thermoplastic resin sheet or by molding both surfaces of the resin sheet at the same time that molten extrusion is performed.

②A planar lens has very small transparent balls arranged two-dimensionally (disclosed in, for example, U.S. Pat. Nos. 2,378,252 and 3,552,822, and Japanese Utility Model Registration Gazette No. 2513508). As shown in FIG. 10(a), in the planar lens, each of the very small transparent balls 1002 has approximately 50% of its diameter embedded in, and held by, a light-incident side transparent layer 1001, and the remaining approximately 50% embedded in a light-exiting side light absorption layer 1003.

The planar lens is obtained by forming a sheet that includes a transparent layer, very small transparent balls, and a light-absorption layer, and then bonding it to a transparent substrate 1004.

However, such related art transmissive screens are subject to the following problems.

In the lenticular lens, it is difficult to achieve a fine pitch when each of the above-described molding methods is performed on thermoplastic resin, so that when the lenticular lens is used as a screen of a rear projector, which in recent years has been used to provide increasingly higher definition, there is a problem in that deterioration of image quality occurs due to reduced resolution and production of moiré. In addition, a very small light diffusing material is typically mixed in the inside portion of the lenticular lens in order to increase the viewing angle in the vertical direction (a direction parallel to the lenticular lens, which is represented by reference numeral 903 in FIG. 9(b)) in which the lenticular lens does not have optical power. This gives rise to the problem that image quality is deteriorated because speckles are produced due to the interference of image light caused by the light-diffusing material. Further, both of the molding methods performed on the thermoplastic resin require large molding machines or dies having diagonals that are equal to or greater than 50 inches, which are of the same size as the screen of the rear projector, giving rise to the problem that production costs become very high.

On the other hand, in the planar lens having very small transparent balls that are arranged two-dimensionally, as shown in FIG. 10(b) in which the planar lens is viewed from an image light incident side, dead spaces, which do not pass image light, are formed between the individual very small balls 1002, so that the image light incident thereupon is not transmitted to the observer side. In addition, it is very difficult to completely perform a minute filling operation with respect to the very small balls, so that the dead spaces increase in size. Further, since the thin light absorption layer 1003 remains at the observer-side surfaces of the very small transparent balls, light is absorbed. Due to these three reasons, the problem arises that light transmittance of the transmissive screen is low.

Since the increase in the viewing angle by the very small balls is completely isotropic, light is also diffused in the vertical direction, in which the viewing angle does not normally need to be increased very much, to the same extent as in the horizontal direction. This gives rise to the problem of insufficient brightness when the image is viewed from the front.

In general, the planar lens is produced by the step of forming a sheet including a transparent layer, very small transparent balls, and a light absorption layer, and bonding the sheet to a transparent substrate. However, in the step of bonding the sheet to the transparent substrate, unevenness in the bonding occurs, so that the display of the image becomes non-uniform, and by insufficient adhesiveness between the sheet and the transparent substrate, interfacial multiple reflection occurs, thereby giving rise to the problem of reduced resolution.

SUMMARY OF THE INVENTION

In order to address the above-described problems, it is an object of the present invention to provide a method of producing, at a low cost, a transmissive screen which is bright, which has high contrast and resolution, and which is capable of displaying a high-quality image without or with reduced moiré and scintillation.

In order to address the above-described problems, a first aspect of the present invention provides a method of producing a transmissive screen having a structure that includes light-absorption-material patterns formed at locations corresponding to locations of lens members, which are provided side by side on a light-transmissive substrate, and to locations of boundary portions between the corresponding lens members. The method includes the step of forming the lens members or precursors thereof by causing very small drops of lens compositions to be discharged and to land near a light-transmission area on a surface of the light-transmissive substrate. An inkjet recording head causes the very small drops of the lens compositions to be discharged and to land. Preferably, the inkjet recording head is a piezo jet recording head.

According to this aspect, the individual lens members, formed on the surface of the transmissive screen, are formed by the discharging of lens compositions from an inkjet recording head, typified by, for example, a piezo jet recording head, having the excellent feature of forming a very fine form with high precision over a large area. Therefore, very fine lens members can be produced. Consequently, it is possible to provide a transmissive screen which provides excellent resolution and which does not have or lessens reduced image quality due to moiré. In addition, this method can be used in producing a transmissive screen by a manufacturing device including a mechanism that scans the piezo jet recording head in the horizontal/vertical directions of the screen. Therefore, the required use of expensive manufacturing devices, such as large dies and molding devices, is reduced or obviated, thereby making it possible to reduce production costs.

In a second aspect of a method of producing a transmissive screen in accordance with the present invention, the surface form of each of the lens members is restricted by adjusting the surface tension and viscosity of each of the lens compositions, and the wettability of each of the lens compositions and a surface which each of the lens compositions contacts.

According to this aspect, a processing operation using a die is not required, so that the forms of the lens members can be controlled by a simple step, thereby making it possible to reduce production costs.

A third aspect of a method of producing a transmissive screen in accordance with the present invention includes the step of forming the light-absorption-material patterns into the shape of a bank on a surface of the light-transmissive substrate prior to forming the lens members and the precursors thereof by causing the very small drops of the lens compositions to be discharged and to land near a light-transmission portion of the bank-shaped light-absorption-material patterns.

According to this aspect, the lens resin compositions are discharged onto the vicinity of the light-transmission portions of the bank-shaped light-absorption-material patterns in order to form the lens members, so that the light-absorption-material patterns and the lens members are aligned with high precision, thereby increasing the light transmittance of the transmissive screen.

In a fourth aspect of a method of producing a transmissive screen in accordance with the present invention, the surface of the light-transmissive substrate on which the light-absorption-material patterns are formed is different from the surface where the lens members are formed.

According to this aspect, it no longer becomes necessary to consider the chemical reaction between the light-absorption-material-pattern compositions and the lens member compositions, thereby increasing the variety of materials from which selection can be made, so that it is possible to provide a low-cost transmissive screen using low-cost materials.

In a fifth aspect of a method of producing a transmissive screen in accordance with the present invention, the light-absorption-material patterns or precursors thereof are formed by causing very small drops of light-absorption-material pattern compositions to be discharged and to land. An inkjet recording head causes the very small drops of the light-absorption-material pattern compositions to be discharged and to land. Preferably, the inkjet recording head is a piezo jet recording head.

According to this aspect, since the light-absorption-material patterns and the lens members can be formed by the method of discharging very small drops and causing them to land, the production process is simplified, thereby making it possible to provide a low-cost transmissive screen.

In addition, since the light-absorption-material patterns are formed by discharging the light-absorption-material-pattern compositions from the inkjet recording head, typified by, for example, a piezo jet recording head, having the excellent feature of forming a very fine form with high precision over a large area, it is possible to form very fine light-absorption-material patterns. Therefore, it is possible to provide a transmissive screen which provides excellent resolution and which does not have or lessens reduced image quality due to moiré. Further, this method can be used to produce a transmissive screen by a manufacturing device including a mechanism that scans the piezo jet recording head in the horizontal/vertical directions of the screen. Therefore, expensive manufacturing devices, such as large dies and molding devices, are not required, thereby making it possible to reduce production costs.

A sixth aspect of a method of producing a transmissive screen in accordance with the present invention includes the step of restricting a planar form of each of the lens members on the surface of the light-transmissive substrate situated at the side where the lens members are formed prior to forming the lens members or the precursors thereof, with the restricting operation being a chemical operation or a restricted form formation operation, which restrict spreading of the lens member compositions on the transparent substrate.

According to this aspect, since the forms of the lens members can be controlled without using a die, it is possible to produce a transmissive screen having any viewing angle at a low cost.

In a seventh aspect of a method of producing a transmissive screen in accordance with the present invention, the step of restricting the planar form of each of the lens members is the same as the step of forming the light-absorption-material patterns.

According to this aspect, it is possible to omit additional steps of restricting the planar forms, so that the process can be simplified.

In an eighth aspect of a method of producing a transmissive screen in accordance with the present invention, adjacent lens members are formed of different lens member compositions. Preferably, the different lens member compositions are adjusted so as to not or only slightly mix with each other.

According to this aspect, since the adjacent lens member compositions may be those that do not mix easily with each other, it is possible to reduce the distances between the adjacent lens members, so that dead spaces become smaller.

Therefore, it is possible to realize a transmissive screen having high light transmittance.

A transmissive screen in accordance with an aspect of the invention is produced by any one of the methods of producing a transmissive screen.

According to this aspect, the individual lens members, formed on the surface of the transmissive screen, are formed by the discharging of lens compositions from an inkjet recording head, typified by, for example, a piezo jet recording head, having the excellent feature of forming a very fine form with high precision over a large area. Therefore, very fine lens members can be produced. Consequently, it is possible to provide a transmissive screen which provides excellent resolution and which does not have reduced image quality due to moiré. In addition, in this aspect, this method can be used in producing a transmissive screen by a manufacturing device including a mechanism that scans the piezo jet recording head in the horizontal/vertical directions of the screen. Therefore, the required use of expensive manufacturing devices, such as large dies and molding devices, is reduced or not required, thereby making it possible to reduce production cost, and thus to provide a low-cost transmissive screen.

In a second form of a transmissive screen of the present invention, spectral characteristics of the light-transmissive substrate, each of the lens members, and each of the light-absorption-material patterns, are substantially uniform or smooth in light transmission or light absorption properties in the visible region.

According to this aspect, since the color of the display image can be effectively reproduced, it is possible to realize a transmissive screen which can display a high-quality image.

In a third aspect of a transmissive screen of the present invention, the form of the bottom side of each of the lens members to be formed is substantially rectangular.

According to this aspect, since the bottom side forms of the individual lens members are substantially rectangular, when the individual lens members are subjected to a filling operation performed with close attention, dead spaces between the individual lens members are not generated. Therefore, it is possible to realize a bright transmissive screen having high light transmittance.

In a fourth aspect of the transmissive screen of the present invention, where the radius of curvature of each of the lens members, which is to be formed, in a horizontal direction of the transmissive screen is RH, and the radius of curvature of each of the lens members, which is to be formed, in a vertical direction of the transmissive screen is RV, RH<RV.

According to this aspect, since the optical power of each lens member in the horizontal direction is greater than the optical power of each lens member in the vertical direction, the viewing angle of the transmissive screen in the horizontal direction can be made to be larger than the viewing angle of the transmissive screen in the vertical direction. Therefore, it is possible to adequately diffuse image light which has passed through the transmissive screen in the proper direction in accordance with the viewing angle characteristic of a human being. Consequently, a bright transmissive screen can be realized.

In a fifth aspect of a transmissive screen of the present invention, where the width of each of the lens members, which is to be formed, in a horizontal direction thereof is WH, and the width of each of the lens members, which is to be formed, in a vertical direction thereof is WV, WH<WV.

According to this aspect, where the form of the surface of each lens member is restricted by adjusting the surface tension and viscosity of each of the lens compositions and the wettability of each of the lens compositions and a surface which each of the lens compositions contacts, the radius of curvature of the larger-width portion of each lens member becomes large and that of the smaller-width portion of each lens member becomes small. When this is examined from the point of view of optical power, the smaller radius of curvature corresponds to the larger optical power. Therefore, by causing the horizontal-direction width of each lens member to be smaller than the vertical-direction width thereof as in this aspect, the optical power in the horizontal direction becomes larger than that in the vertical direction, so that the viewing angle of the transmissive screen in the horizontal direction can be made larger than that of the transmissive screen in the vertical direction. Therefore, it is possible to adequately diffuse image light which has passed through the transmissive screen in the proper direction in accordance with the viewing angle characteristic of a human being. Consequently, a bright transmissive screen can be realized.

In a sixth aspect of a transmissive screen of the present invention, the distances between adjacent landing target locations of the lens compositions are not uniform in a plane of the transmissive screen.

According to this aspect, since the lens members are not disposed at the transmissive screen in a regular manner, it is possible to enhance the quality of a projected image with reduced moiré.

In a seventh aspect of a transmissive screen of the present invention, the distances between the adjacent landing target locations of the lens compositions in a horizontal direction, and those in a vertical direction are different. Preferably, where the distances in the horizontal direction are PH, and those in the vertical direction are PV, PH>PV. More preferably, where the diameter of a single lens member is SP, the distances between the adjacent landing target locations of the lens compositions are such that PH>SP>PV.

According to this aspect, it is possible to fuse adjacent lens members in the vertical direction. The resulting compound lens member obtained is such that its vertical-direction radius of curvature is larger than the horizontal-direction radius of curvature, so that it is possible for the horizontal-direction viewing angle of the transmissive screen to be greater than the vertical-direction viewing angle of the transmissive screen.

A ninth aspect is provided of a method of producing a transmissive screen having a structure including light-absorption-material patterns that are formed on locations corresponding to locations of lens members, which are provided side by side on a light-transmissive substrate, and to locations of boundary portions between the corresponding lens members. The method includes the step of forming volume-type phase devices or precursors thereof by causing very small drops of volume-type phase device compositions to be discharged and to land, with the volume-type phase devices having random phase distributions being provided side by side on a surface of the light-transmissive substrate where the lens members are formed or the back side of the surface. An inkjet recording head causes the very small drops of the volume-type phase device compositions to be discharged and to land. Preferably, the inkjet recording head is a piezo jet recording head.

According to this aspect, volume-type phase devices having random phase distribution are provided side by side on the back side of a lens-formation surface of the light-transmissive substrate. Since interference is reduced by randomly disturbing a wave surface of image light, speckles can be considerably reduced. In addition, since the volume-type phase devices are formed by using an inkjet recording head, typified by a piezo jet recording head, production costs can be reduced.

DETAILED DESCRIPTION OF PREFERRED EMBODIMENTS OF THE INVENTION

Hereunder, with reference to the drawings and the like, a detailed description will be provided by providing embodiments of the present invention.
(First Embodiment of a Method of Producing a Transmissive Screen)

FIGS. 1(a)-1(d) are schematics generally illustrating a generalization of the steps used in the first embodiment.

Figure 1:
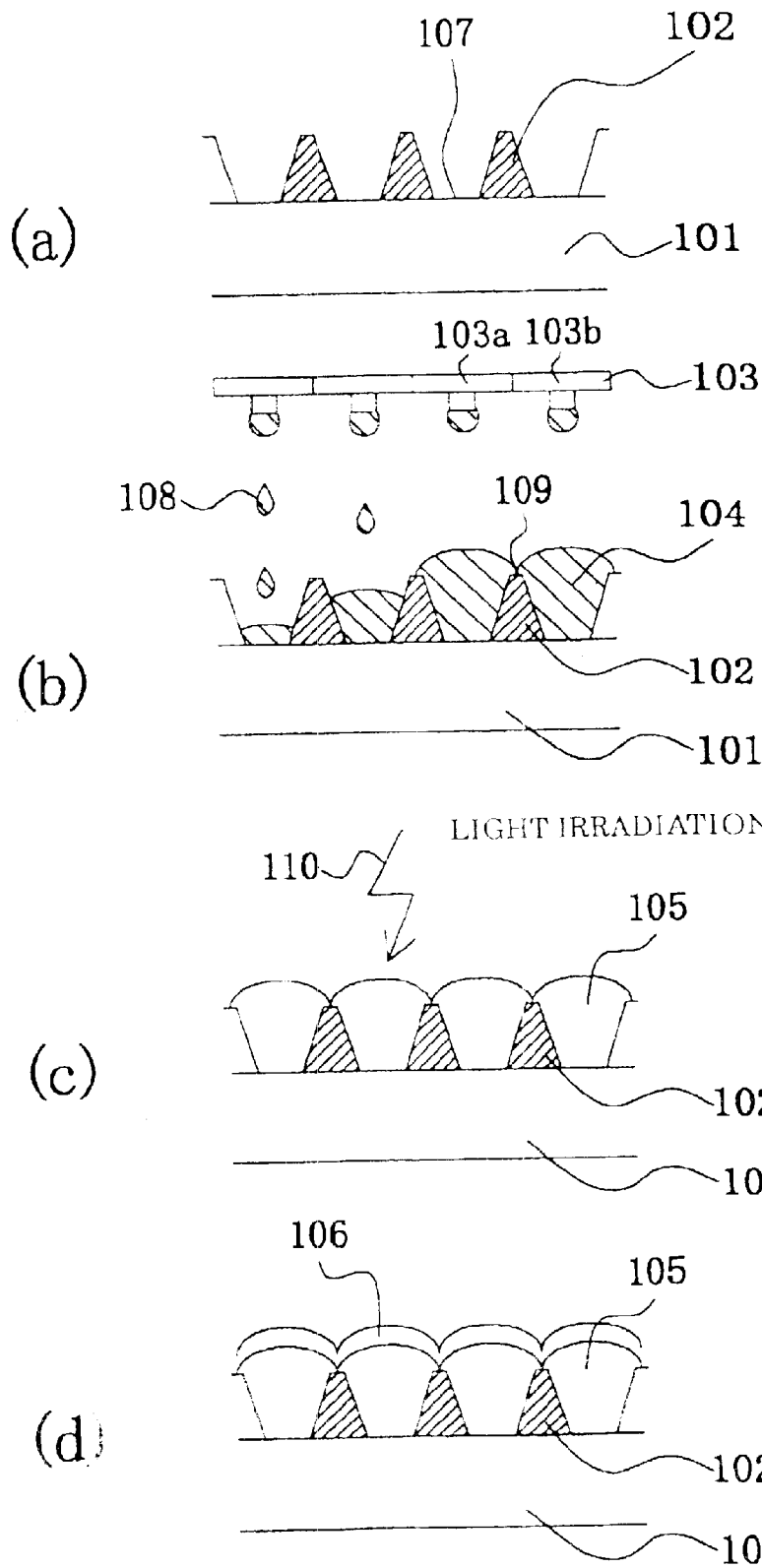
FIGS. 1(a)-1(d) are schematics illustrating the steps of a first embodiment of a method of producing a transmissive screen in accordance with the present invention.

First, as shown in FIG. 1(a), a light-absorption material 102 is subjected to a patterning operation to be a desired form on a light-transmissive substrate 101. It is desirable that the light-transmissive substrate 101 have a substantially uniform light transmittance property over the entire visible region and that this light transmittance be high. The light-transmissive substrate 101 may be made to have light diffusion property by diffusing very small, diffusible particles in the substrate or by forming the surface thereof as a diffusing surface. In addition, it is preferable to form the light-transmissive substrate 101 with a rigid material that can maintain a uniform or smooth light transmissive property when it is incorporated in a rear projector. Examples of such a rigid material are transparent glass substrate and acrylic substrate, but are not limited thereto.

Similarly, it is preferable for the light-absorption material 102 to be a material having a substantially uniform or smooth absorption property over the entire visible region, and for the light transmittance of the material to be low. The characteristics of the material are selected by considering various characteristics from the viewpoints of the patterning method used and chemical interactions between lens members.

Examples of methods of patterning the light-absorption material 102 include photolithography and various other printing techniques, and a method in which a light-absorption material compositions are discharged onto selected locations from an inkjet recording head, typified by a piezo jet recording head, but are not limited to a particular method. However, of these methods, the most preferable method is the method using a piezo jet recording head because, economically speaking, it allows formation of a very fine form over a large area with high precision.

Figure 2:
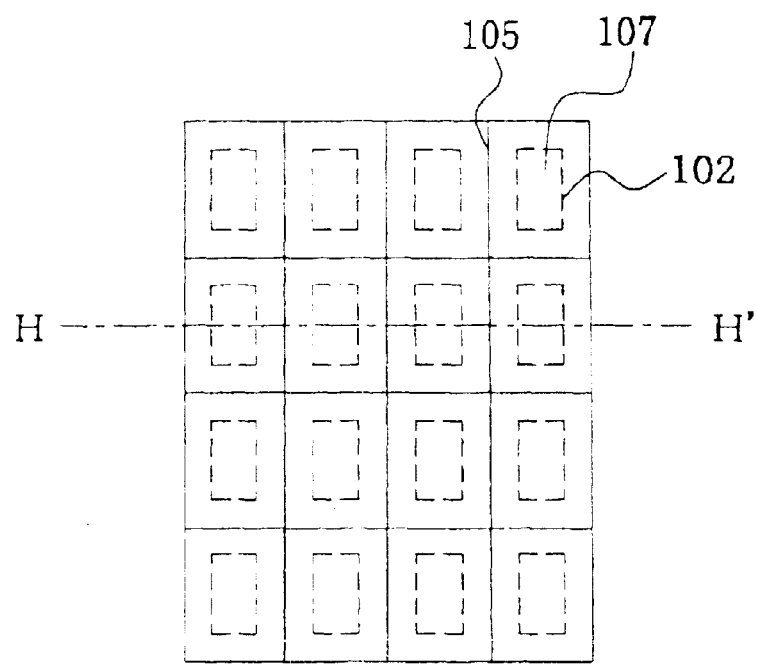
FIGS. 2(a) and 2(b) are a plan view and a sectional view of the structural elements used in the first embodiment.
Figure 2:
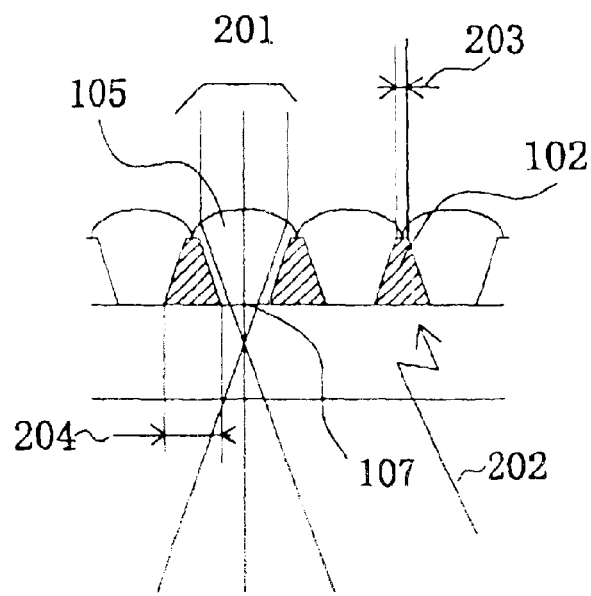

The light-absorption material 102 is formed at locations selected near boundary portions of individual lens members formed in a later step. FIG. 2(a) illustrates the state of arrangement of the light-absorption material 102 in plan view. FIG. 2(a) is a plan view in which the transmissive screen used in the embodiment is viewed from a side from which image light is incident, with a solid line indicating individual lens members 105 and a dotted line indicating the light-absorption material 102. The light-absorption material 102 is provided near the boundary portions of the lens members 105, and open portions 107 passing light rays are formed near the center portions of the lens members 105.

FIG. 2(b) is a cross-sectional view of the transmissive screen and an image light path, in a section taken along plane H—H' of FIG. 2(a). Image light 201 incident upon the lens members 105 is refracted by the lens members 105, passes through the open portions 107, and is transmitted towards an observer. On the other hand, most of the outside light 202 from, for example, an illumination lamp disposed in the space at the observer side, is absorbed by the light-absorption material 102. Therefore, even if the illumination intensity in the space at the observer side is high, it is possible to enjoy observing a sharp black image having high contrast.

Here, where a top side width 203 of the light-absorption material 102 is large, the proportion by which the image light 201 is absorbed becomes large. Therefore, in order to increase transmittance of the image light, it is preferable to make the top side width 203 to be as small as possible.

On the other hand, where a bottom side width 204 of the light-absorption material 102 is made to be as large as possible, the outside light absorption effect is high. From the above, it is desirable that the cross-sectional form of the light-absorption material 102 be a tapering form so as to widen towards the light-transmissive substrate 101.

In order to make the bottom side width 204 of the light-absorption material 102 to be as large as possible, it is desirable for the open portions 107 to be disposed near the focal points of the lens members 105. From this viewpoint, the height of the light-absorption material 102 is determined.

Next, as shown in FIG. 1(b), lens member compositions 108 are discharged into spaces bounded by the light-absorption material 102 from a piezo jet recording head 103 in order to form lens precursors 104.

The piezo jet recording head 103 discharges the supplied lens member compositions from its nozzle by a known inkjet method. To facilitate understanding of the embodiment, only one head is shown, but it is obvious that productivity can be increased by disposing a plurality of heads side by side in order to discharge lens member compositions over a large area and by performing scanning of the plurality of heads in the entire plane of the light-transmissive substrate 101.

The spaces bounded by the light-absorption material 102 are filled with drops 108 of the discharged lens member compositions, and the lens member precursors 104 whose surfaces have been formed into the forms of lenses are formed. The forms of the surfaces of the precursors 104 are determined primarily by the viscosities and surface tensions of the lens member compositions and the wettability of the lens member compositions with respect to the light-absorption material. From these viewpoints, the chemical composition of the light-absorption material and the lens member compositions are adjusted.

Although, in FIG. 1(b), a boundary width 109 between the adjacent precursors 104 is drawn extremely small, from the viewpoint of forming the forms of the surfaces of the precursors 104, the boundary width 109 may be large. However, when the boundary widths 109 are made to be too large, the transmittance of the image light is reduced. From this viewpoint, it is effective to use a method in which different types of compositions that do not mix easily with each other are used for the lens member compositions that are discharged from adjacent nozzles 103a and 103b. This is because, when this method is used, even if the lens member compositions spread, the boundaries between the lens members are naturally formed as a result of the lens member compositions coming into contact with each other. For the lens member compositions that do not mix easily with each other, a hydrophilic composition may be used for one of the lens member composition types, and a hydrophobic composition may be used for the other type of lens member composition. However the lens member composition types which may be used are not limited thereto.

Next, by a post-processing step shown in FIG. 1(c), the precursors 104 are formed into the lens members 105 having desired characteristics. An example of the post-processing operation may be a hardening reaction by, for example, irradiation of light or heating. However, the type of post processing operation is not limited thereto, so that various other types of post-processing operations may be carried out based on the chemical properties of the lens member compositions used. The post processing step includes not only a hardening reaction, but also post-processing to increase light transmittance, post-processing to form the precursors 104 into more desirable forms, etc. If, after dropping the lens member composition liquids, a chemical change occurs as time passes even without performing any processing operation and a desired characteristic is obtained after passage of a certain amount of time, the post-processing step is omitted. An example of such a case is that compositions, which react chemically by mixing two liquids or anaerobic compositions, are used as the lens member compositions.

The following step is performed to provide the lens members with additional characteristics. FIG. 1(d) shows an example in which a transparent protective layer 106 is provided at the surface of each lens member in order to increase the mechanical strength of the transmissive screen. Here, additional characteristics include, in addition to mechanical strength, increased chemical durability by, for example, anaerobic processing, and the increased optical characteristics based on, for example, AR coating.

Figure 3:
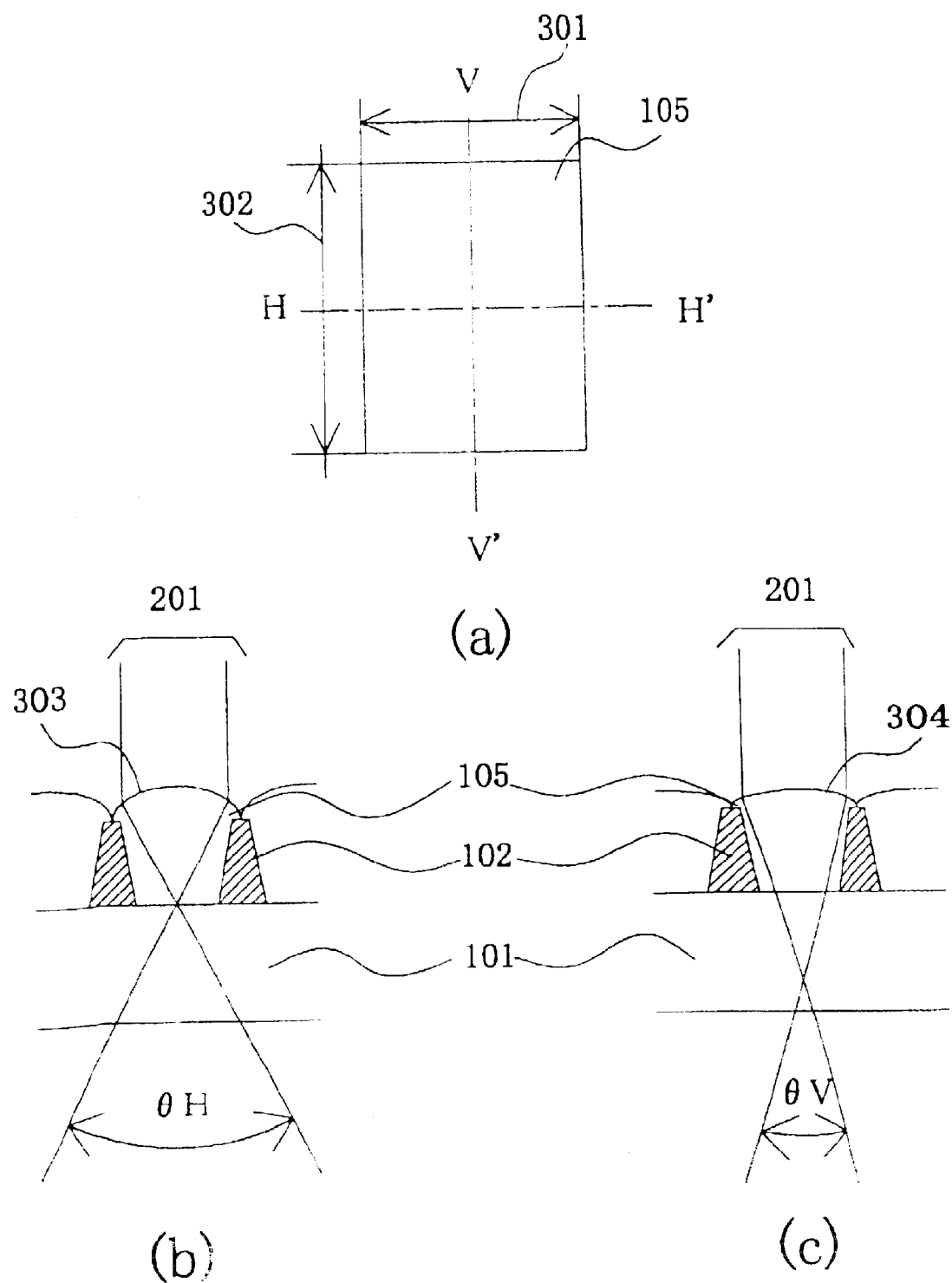
FIGS. 3(a)-3(c) are schematics illustrating the light distribution function of a lens member used in the first embodiment.

FIGS. 3(a)-3(c) are schematics illustrating the structure of a lens member used in the embodiment.

FIG. 3(a) shows the bottom surface form (the form of the surface that contacts the light-transmissive substrate 101) of the lens member 105, in which, where its horizontal-direction width 301 is WH, and its vertical-direction width 302 is WV, WH<WV. Such a bottom surface form is determined by the planar form of the light-absorption material 102.

The form of the surface of the lens member 105 is determined primarily by the viscosity and surface tension of the lens member composition and the wettability of the lens member composition with respect to the light-absorption material, so that where a horizontal-direction radius of curvature 303 of the surface of the lens member 105 along plane H—H' shown in FIG. 3(a) is RH, and a vertical-direction radius of curvature 304 of the surface of the lens member 105 taken along plane V—V' is RV, RH<RV.

Figure 11:
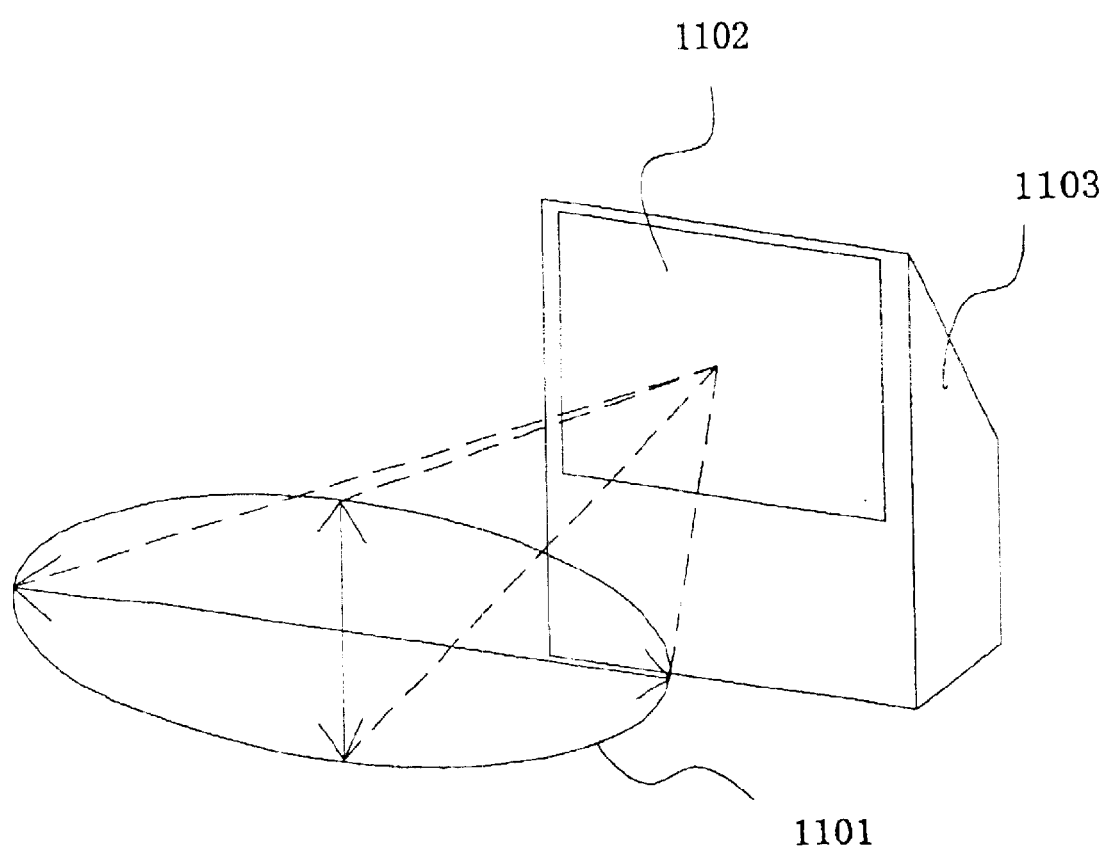
FIG. 11 is a schematic illustrating the light distribution of a transmissive screen.

FIG. 3(b) is sectional view of the lens member 105 taken along plane H—H', and FIG. 3(c) is a sectional view of the lens member 105 taken along plane V—V'. As mentioned above, since RH is smaller than RV, the optical power of the lens member 105 in the H—H' direction shown in FIG. 3(b) becomes large. Spreading of the image light 201 in this direction after it has exited from the light-transmissive substrate 101 is θH. In contrast, the optical power of the lens member 105 in the V—V' direction becomes smaller. When spreading of the image light 201 in this direction after it has exited from the light-transmissive substrate 101 is defined as θV, θH>θV, so that it becomes possible to control the viewing angle to be suitable for the viewing-angle characteristics of a human being, which has been described with reference to FIG. 11.

(Second Embodiment of a Method of Producing a Transmissive Screen)

FIGS. 4(a)-4(d) are schematics generally illustrating the steps used in the second embodiment of the present invention.

As shown in FIG. 2(a), on the light-transmissive substrate 101, lens form restriction patterns 401 are formed by patterning at selected locations near the boundary portions of the individual lens members that are formed in a later step. Examples of the method of forming the lens form restriction pattern 401 by patterning are photolithography and various other printing techniques, and a method in which a lens form restriction material compositions are discharged onto selected locations from an inkjet recording head, typified by a piezo jet recording head, but are not limited to a particular method. However, of these methods, the most preferable method is the method using a piezo jet recording head because, economically speaking, it allows formation of a very fine form over a large area with high precision.

It is preferable that, over the entire visible region, the light transmittance property of the lens form restriction patterns 401 be substantially uniform or smooth, and that the light transmittance be high. By making use of its chemical properties at its surface, the lens form restriction patterns 401 restrict the forms of the lens members that are formed in a later step. For example, the pattern surface may have a hydrophilic property and the composition of each lens member may have a hydrophobic property. Examples are not limited to these.

A film 402 for a light-absorption material is formed at the back side of the portion of the light-transmissive substrate 101 where the lens form restriction patterns 401 are formed.

The film 402 for the light-absorption material is a photosensitive film, and portions thereof upon which light has impinged, and portions thereof upon which light has not impinged, have different chemical and optical properties.

Typical examples of such a film are a positive photosensitive adhesive which exhibits the property of losing its adhesiveness by being exposed, and chromarin film (produced by E.I. Du Pont de Neumours Inc.), but are not limited thereto.

Figure 4:
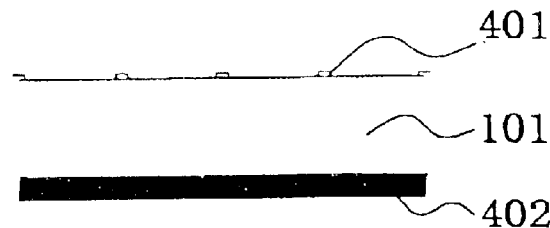
FIGS. 4(a)-4(b) are schematics illustrating the steps of a second embodiment of a method of producing a transmissive screen in accordance with the present invention.
Figure 4:
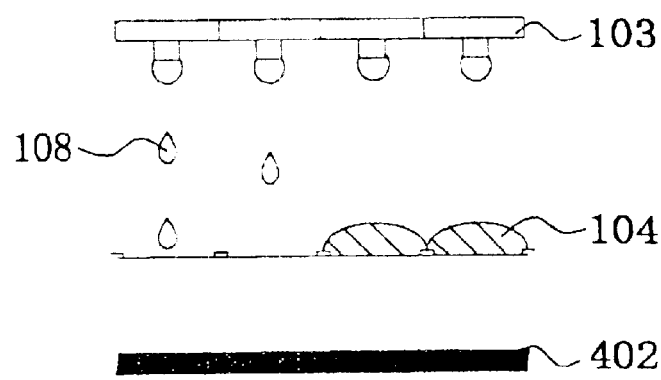
Figure 4:
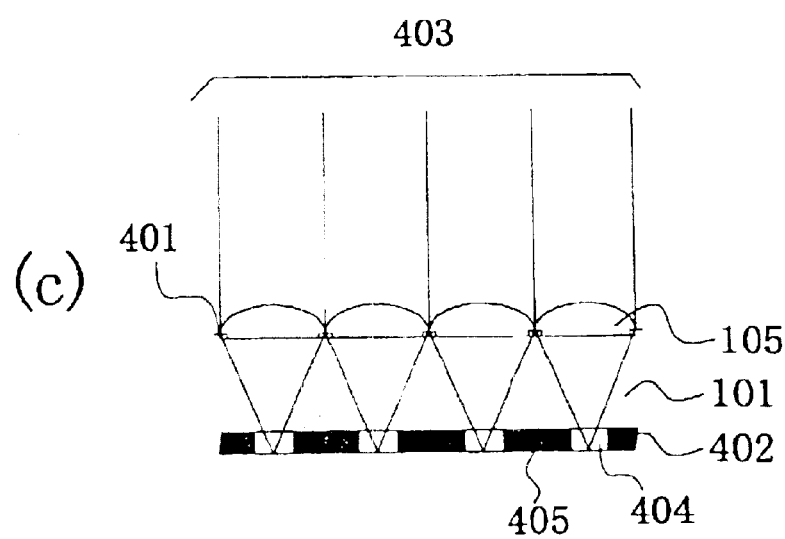
Figure 4:
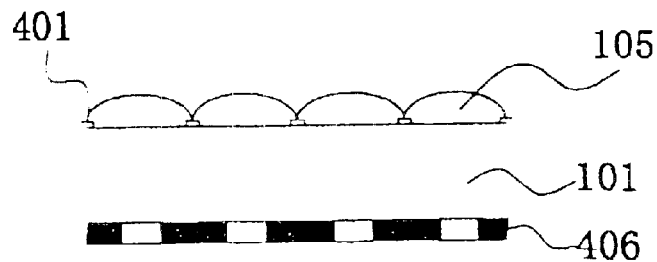

Next, as shown in FIG. 4(b), from the piezo jet recording head 103, lens member compositions 108 are discharged onto the surface of the transparent substrate bounded by the lens form restriction patterns 401 in order to form the lens precursors 104. This step has been described in detail in the first embodiment, and the description thereof is omitted.

Next, as shown in FIG. 4(c), from the lens member 105 side, the light-absorption-material film 402 is radiated with an electromagnetic wave 403 having a wavelength that causes photosensitive reaction, and by each lens member 105, the electromagnetic wave 403 converges near the light-absorption-material film 402 in order to cause a photosensitization action to occur at selected locations of the light-absorption-material film 402.

In this step, each lens member 105 may be in the lens precursor state. When a hardening reaction, a light transmittance increasing reaction, etc., are caused to occur by the electromagnetic wave 403, so that a change to a more preferable state can be achieved, the step can be simplified, which is preferable.

Portions 404 where a photosensitization reaction has occurred at selected locations of the light-absorption-material film 402 are transparent portions, so that image light that has converged by each lens member 105 passes therethrough. On the other hand, portions 405 which have not been exposed exhibit light absorptivity, so that it absorbs outside light.

When the aforementioned chromarin film is used, the portions 404 where a photosensitive reaction has occurred lose their adhesiveness, and the adhesiveness of the portions 405 that have not been exposed remains. Therefore, in a post-processing step (not shown), for example, powder having light-absorption property is scattered on the light-absorption-material film 402. Where this is selectively made to adhere to the portions 405 which have not been exposed, it is possible to form light-absorption-material patterns 406 at selected locations.

As is clear from FIG. 4(c), in the embodiment, the thickness of the light-transmissive substrate 101 is set so as to be substantially the same as the light converging distance of each lens member 105. The light converging distance is the distance substantially equal to f×n, where the focal length of each lens member 105 in air is f, and the refractive index of the light-transmissive substrate 101 is n.

(Third Embodiment of a Method of Producing a Transmissive Screen)

FIGS. 5(a)-5(d) are schematics that generally illustrate the steps used in the third embodiment of the present invention.

First, as shown in FIG. 5(a), a surface treatment layer 501 having high transparency is uniformly formed on the light-transmissive substrate 101. The surface treatment layer 501 has liquid repellency with respect to each of the lens member compositions to be discharged on this layer. In other words, where each of the lens member compositions is a hydrophilic material, it has water repellency, whereas where each lens member composition is a lipophilic material, it is hydrophilic.

The surface-treatment layer 501 is formed by various thin film formation technologies, such as spin coating, dipping, printing, spraying, vapor deposition, sputtering, or forming of a self-organizing film, in accordance with the physical properties of the material of the surface-treatment layer 501.

Of these technologies, the thin film formation technology that is used to form a self-organizing film is suitable for the present invention because the liquid repellency of the self-organizing film can be easily controlled and the formation of the self-organizing film does not require a special device.

The self-organizing film is a molecular film containing organic molecules. The organic molecules each contain a functional group which can combine with the light-transmissive substrate 101; a functional group, such as a lyophilic group or a liquid-repellent group, provided opposite to the previous functional group, to modify the nature of the surface of the light-transmissive substrate 101 (that is, controlling the surface energy); and a normal carbon chain which combines with these functional groups or a carbon chain having a portion thereof branched. These organic molecules combine with the light-transmissive substrate 101 and are self-organized in order to form a molecular film, such as a monomolecular film. The self-organizing film contains a bonding functional group that can react with constituent molecules of the light-transmissive substrate 101, and other straight-chain molecules. It is a film in which compounds, having very high orientation properties by interaction between the straight-chain molecules, are aligned. Since the self-organizing film is formed by aligning single molecules, it is a uniform film on the molecular level. In other words, since the same molecules are positioned at the surface of the film, the surface of the film is uniform and can be provided with surface properties, such as excellent liquid repellency and a lyophilic property.

Examples of the compounds making up the self-organizing film include alkylsilanes containing an alkyl group or fluoroalkylsilanes, such as heptadecafluorotetrahydrodecyltriethoxysilane or trifluoropropyltrimethoxysilane. The self-organizing film is disclosed in detail in, for example, "An Introduction Ultrathin Organic Films," Ulman, Academic Press.

When the surface-treatment layer 501 is formed using the self-organizing film, any one of the aforementioned material compounds and the light-transmissive substrate 101 are placed in the same sealed container. When the temperature is ordinary temperature, the surface-treatment layer 501 is formed by leaving it for a few days. By maintaining the whole sealed container at a temperature of approximately 100° C., the surface-treatment layer 501 can be formed approximately three hours. In this way, since the step of forming the surface-treatment layer 501 using a self-organizing film is very simple and does not require a special device, this step is particularly suitable for producing a large transmissive screen.

A light-absorption film 502 is formed on the back side of the surface of the light-transmissive substrate 101 where the surface-treatment layer 501 is formed. The light-absorption layer 502 is formed of a material which has a smooth light transmittance in the visible region and which has high absorptivity with respect to laser light. In accordance with the physical properties of the material of the light-absorption layer 502, the light-absorption layer 502 is formed by various thin film formation technologies, such as spin coating, dipping, printing, spraying, vapor deposition, sputtering, or forming of a self-organizing film.

Then, as shown in FIG. 5(b), from the piezo jet recording head 103, lens member compositions 108 are discharged onto the surface of the light-transmissive substrate 101 where the surface-treatment layer 501 is formed, thereby forming the lens precursors 104. However, since, unlike the first and second embodiments, there are no structures or patterns that separate adjacent lenses, special considerations are required to form individual lens members separately.

FIG. 6(a) shows the relationship between the diameter of a lens precursor 104 and a landing target location 601 of the lens member composition on the light-transmissive substrate 101. After the lens member compositions 108 have landed near the landing target locations 601, they run out and spread by contact angles determined by the relationship between their wettability with respect to the surface-treatment layer

Figure 6:
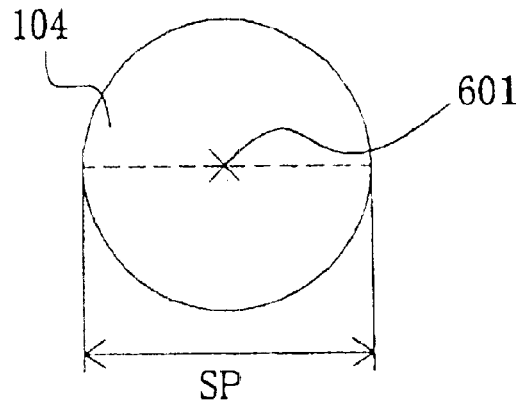
FIGS. 6(a)-6(c) are schematics illustrating a gap between adjacent landing target locations and the planar form of a lens member to be formed in the third embodiment.
Figure 6:
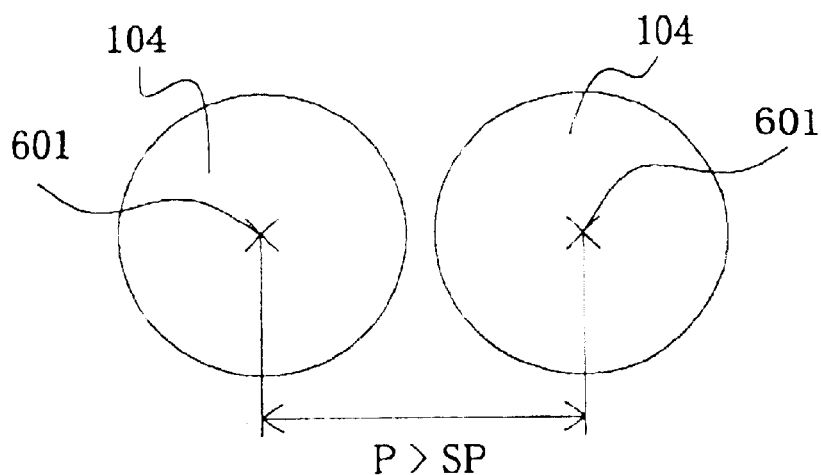
Figure 6:
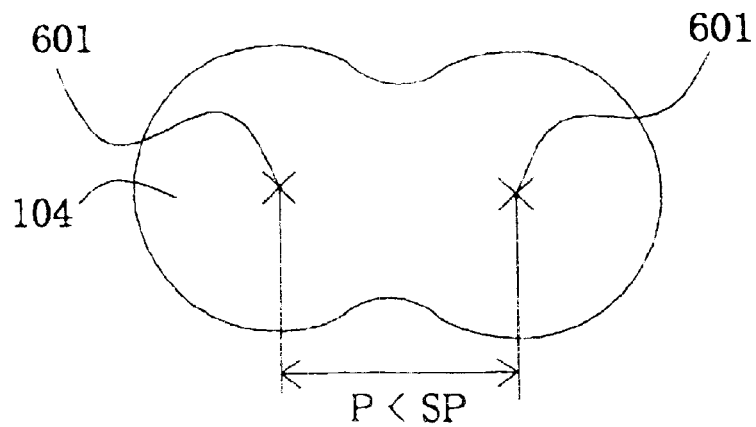

501, thereby forming the lens precursors 104 having curvatures determined by the surface tensions of the lens member compositions 108. The planar forms of the precursors 104 are substantially circular having diameters SP with the corresponding landing target locations 601 being the substantial centers thereof. Therefore, as shown in FIG. 6(*b*), when an interval P between adjacent landing target locations 601 is such that P>SP, individual lens precursors 104 that are separated from each other can be formed. When P is excessively larger than SP, the dead spaces between the lens precursors 104 become large, thereby reducing the light transmittance of the transmissive screen, so that this is not preferable. In addition, as shown in FIG. 6(*c*), when the interval P between adjacent landing target locations 601 is set so that P<SP, after the lens member compositions 108 have landed, the adjacent lens member compositions coalesce, so that separate individual lens precursors cannot be formed.

Therefore, when a pitch PN between the adjacent nozzles 103*a* and 103*b* of the piezo jet recording head 103 is such that PN>SP, it is possible to separately form adjacent individual lens precursors 104. Although the example of adjusting the pitch PN between the adjacent nozzles has been described above, it is obvious that the same advantages can be obtained by suitably controlling a scanning pitch of the piezo jet recording head 103 by setting the pitch PN between the adjacent nozzles to be a distance that is different from the pitches between the adjacent lens precursors 104.

In addition, it is possible to control the viewing angle of the transmissive screen by positively fusing the adjacent lens precursors 104 into an integral structure.

Figure 7:
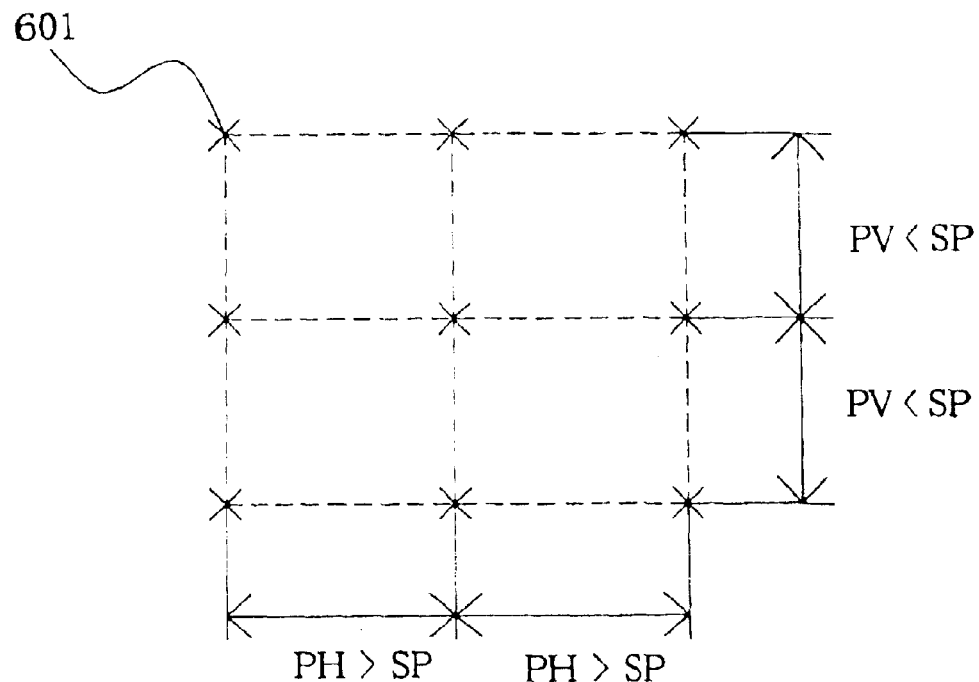
FIGS. 7(a) and 7(b) are schematics illustrating a gap between some other adjacent landing target locations and the planar form of the lens member to be formed in the third embodiment.
Figure 7:
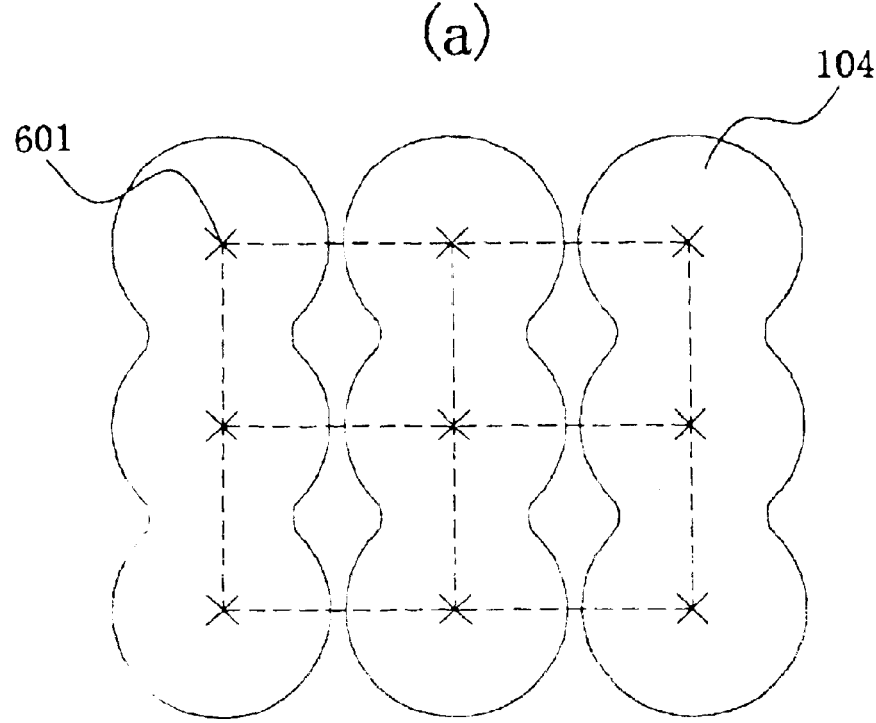

FIG. 7(*a*) illustrates the arrangement of nine adjacent landing target locations 601. A horizontal-direction pitch PH between adjacent landing target locations 601 is set so that PH>SP, while a vertical-direction pitch PV is set so that PV<SP. Each lens member composition 108 is discharged onto and lands on each of these landing target locations 601, so that, as shown in 7(*b*), the lens precursors 104 having planar forms that are individually and separately formed in the horizontal direction and having fused forms in the vertical direction are formed. With regard to the curvature of each lens member obtained from its corresponding lens precursor 104, where the horizontal-direction radius of curvature is RH and the vertical-direction radius of curvature is RV, RH<RV. As described in the first embodiment, the spreading of image light that has passed through each lens member is wider in the horizontal direction in conformity with the viewing angle characteristic of a human being, so that it possesses a viewing angle characteristic that is narrow in the vertical direction.

The pitches between the landing target locations 601 do not have to be uniform over the entire transmissive screen, so that they can be freely set based on desired characteristics. For example, with the vertical-direction pitches made variable, the number of lens member compositions that are fused can be controlled in order to adjust the vertical viewing angle or the regularity of the pitches in the horizontal and vertical directions can be reduced in order to reduce moiré that occurs due to the interaction between the image light and the optically regular patterns of the lens members.

Figure 5:
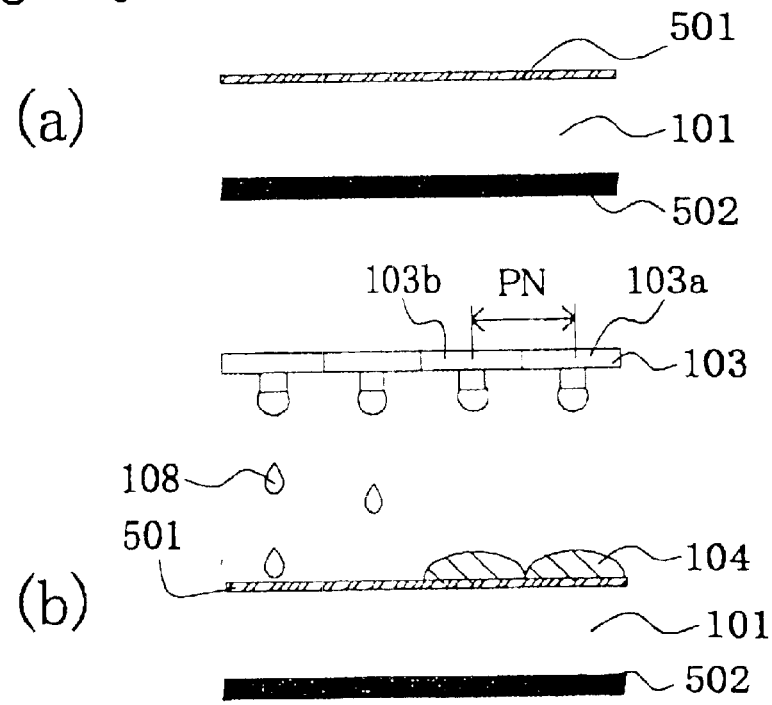
FIGS. 5(a)-5(d) are schematics illustrating the steps of a third embodiment of a method of producing a transmissive screen in accordance with the present invention.
Figure 5:
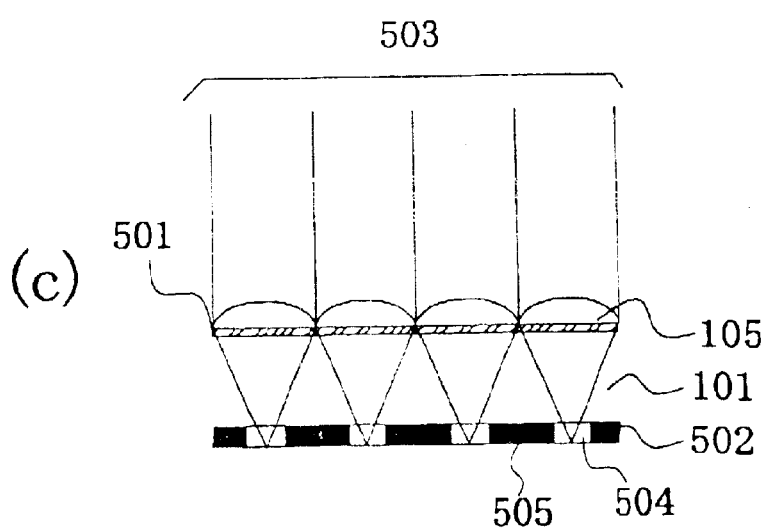
Figure 5:
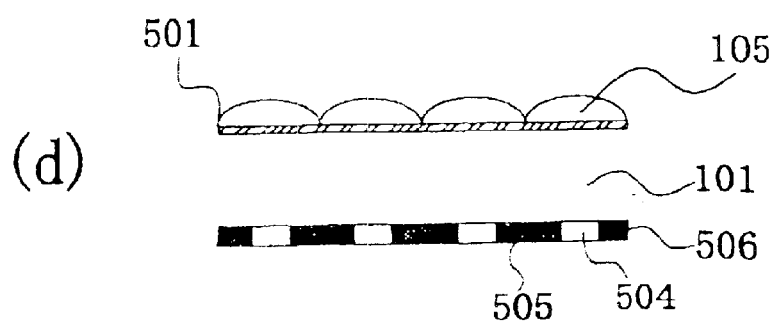

Next, as shown in FIG. 5(*c*), laser light 503, having an intensity equal to or greater than a threshold value that causes, in its converged state, fusion/evaporation or abrasion of the material of the light-absorption layer 502, is caused to impinge from the lens member 105 side, and to converge near the light-absorption layer 502. Fusion/evaporation or abrasion is caused to occur at selected locations of the light-absorption layer 502 near the converging portion of the laser light 503, thereby forming open portions 504. In this step, each lens member 105 may be in a lens precursor state, and if, for example, a hardening reaction or a light transmittance increasing reaction is caused to occur by the laser light 503, so that changes to a more preferable state are achieved, the step can be simplified, which is preferable.

The open portions 504 of a light-absorption-material pattern 506 pass the image light that has been converged by each lens member 105. Un-open portions 505 exhibit light absorption, so that they absorb outside light.

As is well known, it is necessary for the laser light to have a high energy value in order to cause fusion/evaporation or abrasion to occur at the laser light absorption material. Examples of lasers which produce such laser light are an excimer laser using, for example, XeF; an Nd:YAG laser; a Ti:Al$_2$O$_3$ laser and a laser producing light obtained after harmonic and wavelength changes thereof have been made; and a dye laser. In order to irradiate the large-area light-transmissive substrate 101 with intense laser light over the entire area thereof, scanning the entire area with a small-area laser light spot by light-deflecting means is effective from the viewpoints of preventing the laser device from becoming large in size and complicated.

(Fourth Embodiment of a Method of Producing a Transmissive Screen)

Figure 8:
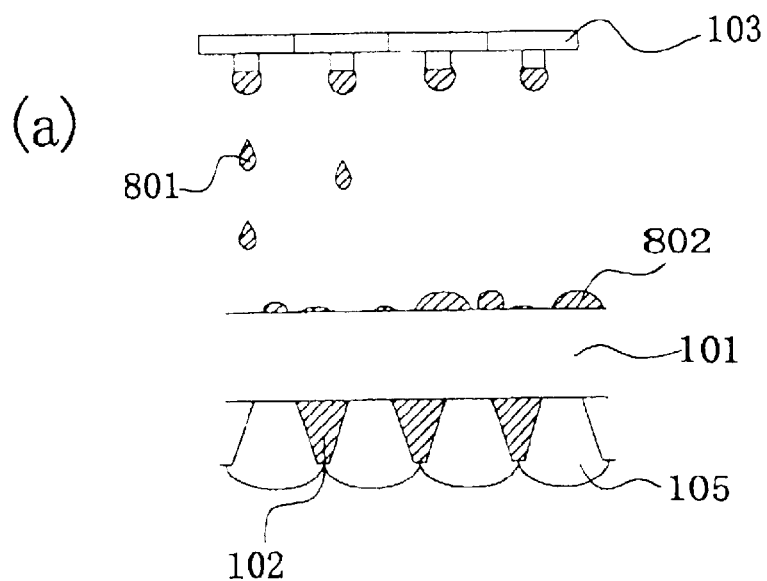
FIGS. 8(a) and 8(b) are schematics illustrating the steps of a fourth embodiment of a method of producing a transmissive screen in accordance with the present invention.
Figure 8:
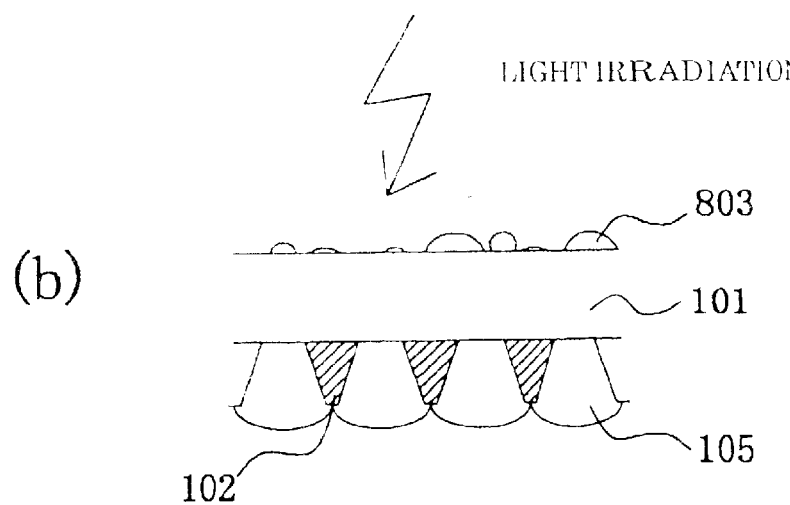
Figure 9:
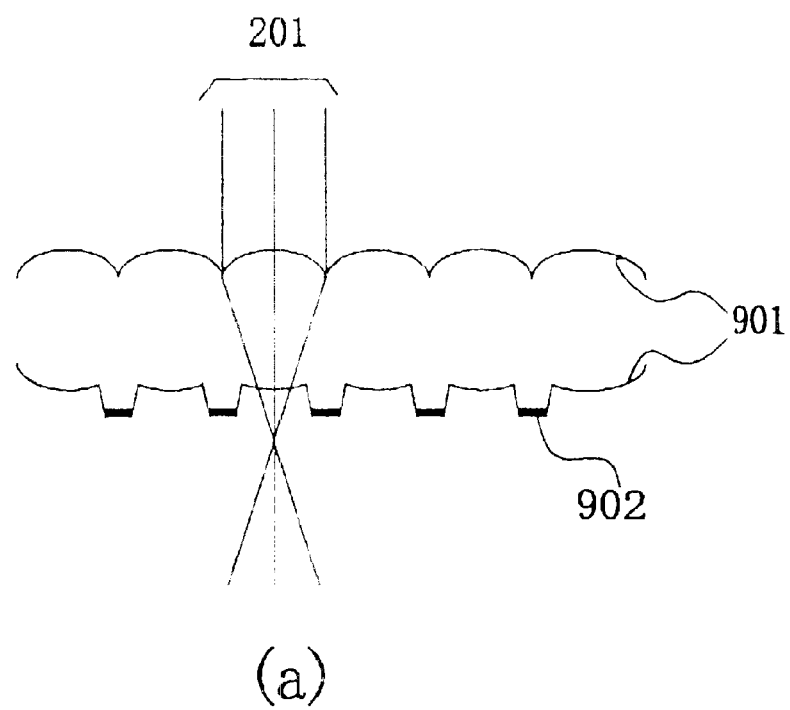
FIGS. 9(a) and 9(b) are schematics of a lenticular lens sheet.
Figure 9:
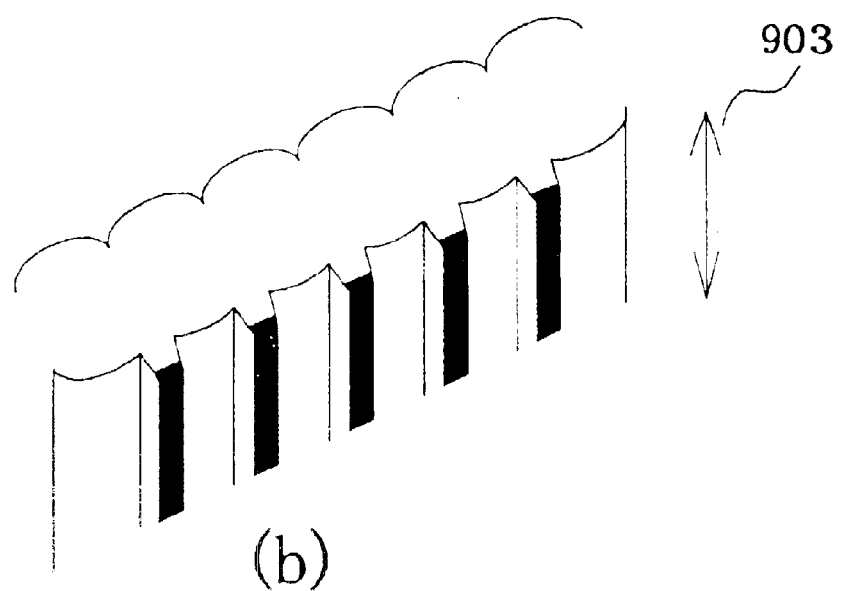
Figure 10:
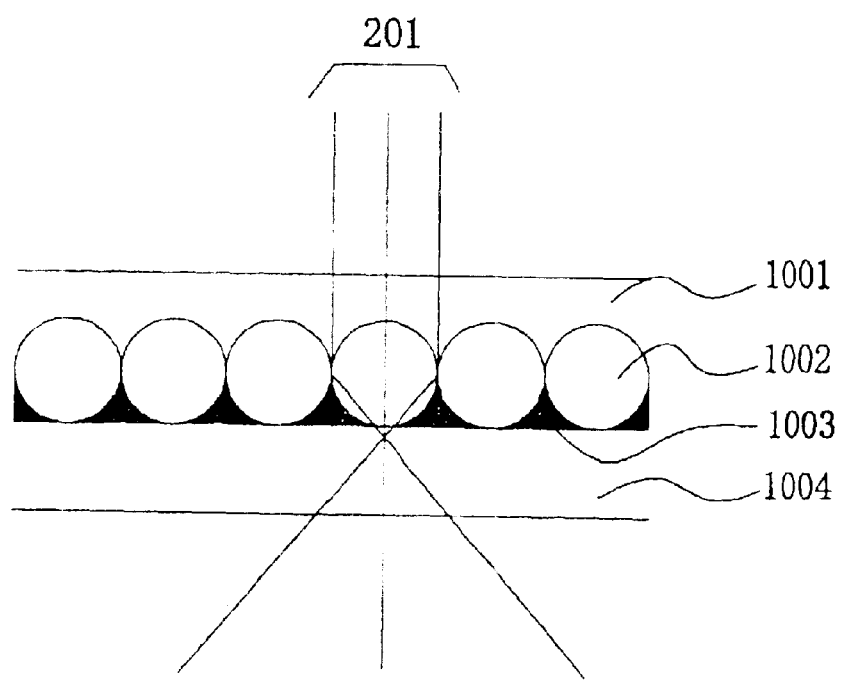
FIGS. 10(a) and 10(b) are schematics of a planar lens.
Figure 10:
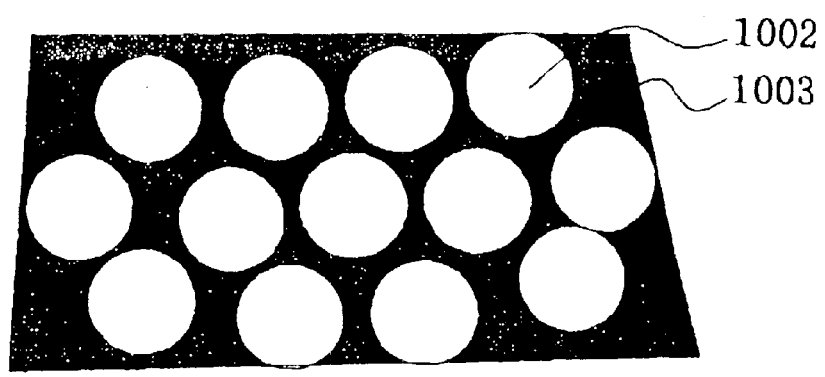

FIGS. 8(*a*) and 8(*b*) are schematics generally illustrating the steps used in the fourth embodiment.

As shown in FIG. 8(*a*), from the piezo jet recording head 103, a volume-type phase device composition 801 is discharged onto the back side of the surface of the light-transmissive substrate 101 where the light-absorption-material pattern 102 and the lens members 105 have already been formed, thereby forming a volume-type phase device precursor 802.

The volume-type phase device precursor 802 is formed of a material having high light transmittance, that is substantially uniform or smooth over the entire visible region, and has a random form and arrangement distribution, which are determined in accordance with the extent to which the coherence of image light is reduced. Such a form and arrangement distribution are provided by randomly changing the liquid amount of the volume-type phase device composition 801 discharged from the piezo jet recording head 103 or by randomly changing the scanning direction and scanning amount of the piezo jet recording bead 103.

Next, as shown in FIG. 8(*b*), the volume-type phase device 803 is provided with more preferable characteristics by, for example, hardening the volume-type phase device precursor 802 by light irradiation, heating, or the like.

In this way, by forming the volume-type phase device 803 on the back side of the surface of the light-transmissive substrate 101 where the lens members 105 are formed, the coherence of image light can be reduced, so that it is possible to enjoy observing a high-quality image having few speckles.

(Fifth Embodiment of a Method of Producing a Transmissive Screen)

Although in the first to fourth embodiments the lens member compositions or the volume-type phase device composition have been described by referring to optically transparent materials which can be discharged by the piezo jet recording head as an example, it is possible to mix very small particles having light diffusing property in order to further increase the light diffusion action of each lens member. Examples of such very small particles are glass beads, styrene beads, and acrylic beads, which have average particle diameters of the order of a few microns to 20 microns. However, the types of very small particles are not limited to these examples.

The above-described lens member compositions are applicable to any one of the first to fourth embodiments, and are effective structural materials to adjust the viewing angle of the transmissive screen.

(Modifications)

The present invention is not limited to the above-described embodiments, so that various modifications and changes may be made within a scope not departing from the gist of the present invention.

For example, although the piezo jet recording head has been referred to as the head member which discharges drops of, for example, lens compositions, other inkjet recording heads having similar functions may be used. A typical example is a bubble jet recording head.

In addition, although the bottom surface of each lens member has been described as having a rectangular form, it may have a circular form, an elliptical form, or an indeterminate form, for example.

Further, although the light-absorption-material patterns have been described as having tapered forms in cross section, they may have rectangular parallelepiped forms or curved forms in cross section.

INDUSTRIAL APPLICABILITY

As described in detail above, according to the present invention, there is provided a method of producing a transmissive screen having a structure including light-absorption-material patterns that are formed at locations corresponding to locations of lens members, which are provided side by side on a light-transmissive substrate, and corresponding to locations of boundary portions between the lens members. In this method, very small droplets of lens compositions are discharged onto and land on the light-transmissive substrate. By the droplets of the lens compositions, the lens members or precursors thereof are formed. This makes it possible to realize, at a low cost, a bright transmissive screen which has high contrast and which can display a high-quality image having reduced moiré and reduced or few speckles.

What is claimed is:

1. A method of producing a transmissive screen having a light-transmissive substrate, lens members and light-absorption-material patterns, comprising:

forming the light-absorption-material patterns;

forming lens form restriction patterns;

discharging lens compositions of at least one of the lens members or precursors of the lens members towards the light-transmissive substrate; and forming the lens compositions into the lens members as boundary portions of the precursors of the lens members are formed over the light-absorption-material patterns, and as the light-absorption-material patterns are formed.

* * * * *